United States Patent [19]

Rakoczy

[11] Patent Number: 4,737,329

[45] Date of Patent: Apr. 12, 1988

[54] PROCESS FOR THE PRODUCTION OF RELIEF IMAGES

[76] Inventor: Jozef Rakoczy, Halleggerstrasse 125, A-9061 Wölfnitz-Klagenfurt, Austria

[21] Appl. No.: 914,255

[22] Filed: Oct. 2, 1986

[30] Foreign Application Priority Data

Dec. 16, 1985 [AT] Austria .................................. 3620/85

[51] Int. Cl.⁴ ............................................. C04B 41/00
[52] U.S. Cl. .................... 264/132; 264/134; 264/153; 264/293; 264/321
[58] Field of Search ............... 264/132, 134, 153, 293, 264/321

[56] References Cited

FOREIGN PATENT DOCUMENTS 2555215 5/1977 Fed. Rep. of Germany .
598440 2/1948 United Kingdom .

*Primary Examiner*—Frank Sever
*Attorney, Agent, or Firm*—Young & Thompson

[57] ABSTRACT

A process for the production of relief images, especially of postcards, greeting cards or the like, wherein a relief is embossed into a polystyrene foam substrate by pressing a heated embossing die against the substrate. A pictorial and/or graphic illustration is applied to the substrate on at least one side thereof, preferably by screen printing. The illustration can be on paper which is applied to the foam sheet. The embossing die is heated to a temperature between 100° and 130° C., preferably 110°–120° C., and is applied agianst the foam with a pressure of at least 0.5 kg/cm² while flatly supporting the foam sheet from the opposite side. The foam sheet has a thickness of 1–3 mm, preferably 1.5–2.0 mm. The substrate can be coated with a clear varnish after the imprinting step and before the embossing step. After the embossing step, the relief thus produced can be separated from a larger portion of the plastic foam sheet. This separation can be effected by a blade having the same temperature as the embossing die used for the embossing step.

13 Claims, No Drawings

PROCESS FOR THE PRODUCTION OF RELIEF IMAGES

The invention relates to a process for the production of relief images, especially pertaining to postcards, greeting cards, or the like, wherein a relief is embossed into the substrate by pressing a heated embossing die against the substrate.

It is conventional to provide postcards, in particular greeting postcards or letter-type greeting cards, with embossings. Since the known embossed postcards or the like consist of paper or cardboard, it is possible only to bring about weak embossings on one side, and this can only be done with relatively high costs.

British patent No. 598,440 proposes to manufacture a decorative article which, for example, is a glue-on edge strip, by embossing with the aid of an embossing roller a relief into a synthetic resin strand extruded onto a supporting layer which latter can be, for example, paper or a synthetic resin. British patent No. 598,440 also mentions the possibility of providing pictorial and/or graphic illustrations; these can be located on the topside of the supporting layer or also on the underside of a cover layer applied to the synthetic resin strand prior to embossing. No information can be derived from British patent No. 598,440 about heating of the embossing roller or data about the pressure with which the embossing roller is applied.

DOS No. 2,555,215, from which a process of the type discussed above has been known, suggests to emboss a substrate (for example a bank note) with the aid of a heated embossing die and simultaneously to apply a cover layer under pressure, this layer consisting of a thermoplastic layer. The application of any imprints onto the substrate is not disclosed.

The invention is based on the object of providing a process of the type described hereinabove making it possible to produce permanently, in a simple way, relief images also embossed within the area of pictorial illustrations.

This object has been achieved according to this invention by utilizing as the substrate a foam panel of a thermoplastic synthetic resin; by applying to the substrate, at least on one side, pictorial and/or graphic illustrations, preferably by the screen printing method; by pressing an embossing die heated to a temperature of between 100° and 130° C., preferably 110°–120° C., against the substrate with a pressure force of at least 0.5 kg/cm$^2$ while flatly supporting the substrate, as conventional, on the side opposite to the relief to be produced; and by optionally removing the relief illustration by separating it from a larger portion of the substrate.

Due to the fact that a foam panel of a thermoplastic synthetic resin is utilized as the substrate, the process of this invention succeeds in producing, with surprisingly low expenditure, sharply textured relief images; the elevation of the raised portions in the relief with respect to the depressions therein can amount to almost the entire thickness of the foam panel. It is furthermore advantageous that the rear face of the relief image remains planar, differently from the conventional embossed paper or cardboard pictures. Any foam panel of a thermoplastic synthetic resin can be used within the scope of this invention, foam panels made of polystyrene foam (so-called polystyrene foam sheets manufactured by the extrusion method) being utilized with preference.

Especially significant aspects of the process according to this invention are the temperature ranges mentioned hereinabove, and the pressing force with which the embossing die is pressed against the substrate. The pressure exerted should be in any event higher than 0.5 kg/cm$^2$; ordinarily, the process should be executed with a pressing force lying between 1.2 and 2.0 kg/cm$^2$.

The pressing force is to be chosen, in any event, so that the desired relief is obtained without entirely forcing the embossing die through the substrate by using a die pressure force that was chosen to be too high.

The process of this invention makes it possible to manufacture postcards in one working step; however, it is also feasible to produce the desired relief within a larger cut-to-size section of the substrate and then cut the relief to the desired dimension. For this purpose, the procedure can be such, within the framework of the invention, that a punching blade is utilized for removing the desired illustration which has the same temperature as the pressing tool during the embossing operation. This mode of operation affords the advantage that the picture has rounded cutting edges.

Within the purview of this invention, a foam panel having a thickness of 1–3 mm, preferably 1.5 to 2 mm, will usually be utilized as the substrate.

If increased ruggedness of the relief image producible according to this invention is desired, then the suggestion is advanced within the scope of this invention to laminate the planar side of the substrate, lying oppositely to the embossed side, with paper, preferably with paper having a weight per unit area of at least 30–40 g/m$^2$. This is of importance in the production of cards or pictures which are to be lettered on their rear side.

The time period during which the embossing die is urged against the substrate will depend on various parameters, such as the thickness of the substrate and the depth to which the desired relief is to be embossed. It is normally sufficient in the process of this invention to press the embossing die against the substrate for about 5–10 seconds.

It is also possible by using the method of this invention to produce combinations of flat and textured images. The procedure here can be such, according to the invention, that a depression having a planar surface is created in the substrate during the embossing step, a piece of a flat material, such as paper, imprinted paper, or the like, being applied to this depression after the embossing step, this material carrying preferably graphic and/or pictorial illustrations. This piece of flat material, e.g. a piece of printing paper, then constitutes a planar surface within the finished image, which surface can, in turn, be provided with imprints or other pictorial illustrations. However, it is also possible to provide the piece of flat material already beforehand with pictorial and/or graphic representations, this piece having been mounted to the foam panel (by purely thermal bonding or by the use of adhesives). This aspect constitutes a special advantage of the process according to the invention since it is possible to apply, in a printing procedure, e.g. screen printing, pictorial and/or graphic illustrations in the area provided with the reliefs, this area, after embossing, then surrounding the planar zone or zones of the relief image.

In order to protect the imprint arranged on the relief image produced according to this invention, the surface of the substrate can be coated with a clear varnish after imprinting and before executing the embossing step. This coating with a clear varnish thus takes place prior to the embossing operation, avoiding any problems in the application of the clear varnish.

The process of this invention can be realized with the aid of a simple press, at least one die of which is heatable. In order to ensure satisfactory support of the substrate during the embossing (pressing) operation, the lower die of the press is preferably designed to be maximally smooth. The embossing die usually acting from above can be provided with the desired relief by chemical or mechanical means, and should likewise be as smooth as possible. For producing relief images having the format of DIN A6, the embossing die is pressed against the substrate at a temperature of between 107° and 120° C. for 5-10 seconds with a weight of 200 kg.

An actual example for the invention, which is not to be considered as limiting, is set forth below.

In this example, a polystyrene foam sheet having a thickness of 3 mm, a density of 120 kg/$m_3$, and a weight of 190 g/$m^2$ is utilized as the substrate. A relief image having the dimensions of 10.5×15 cm is produced.

For this purpose, the sheet is first laminated to a paper (60 g/$m^2$) on its rear side (the side of the substrate not to be provided with a relief).

The thus-laminated polystyrene foam sheet is inserted in a press, the lower die of which is completely planar and smooth. The upper, movable die of the press, the embossing die, is equipped with the negative of the relief to be produced and has been heated to a temperature of 112° C.±3° C. For producing the relief, the embossing die is pressed with a force of 189 kg (1.2 kg/$cm^2$) against the substrate for 5 seconds. After the embossing die has been lifted off, the image, for example the postcard, is punched out of the substrate with the aid of drop punching tools heated to a temperature of 112° C.

Before beginning with the embossing of the relief, an image had been imprinted with the use of the screen printing technique, utilizing printing inks "Jet Satin" (manufacturer: Sericol).

Prior to the punching and embossing operation, the surface of the polystyrene foam sheet to be provided with the relief had been coated with a clear varnish in order to protect the print and to render the relief image glossy.

With the above-indicated process parameters, embossings having a depth of up to 2 mm were obtained in the polystyrene foam sheet (total thickness of polystyrene foam sheet 3mm).

What is claimed is:

1. Process for the production of relief images comprising:
   providing a sheet of foamed thermoplastic synthetic resin;
   heating an embossing die to a temperature of 100°—130° C.;
   pressing said heated die against said sheet with a force of at least 0.5 lg/$cm^2$ while flatly supporting said sheet from its side opposite said die sufficient to form a relief image on said sheet.

2. A process as claimed in claim 1, and applying to the sheet illustration prior to said pressing.

3. A process as claimed in claim 1, and removing the relief image thus produced by separating it from a larger portion of the sheet.

4. A process as claimed in claim 3, and utilizing for said separating a punching blade having the same temperature as the embossing die used during the embossing step.

5. A process as claimed in claim 1, in which said foamed sheet has a thickness of 1-3 mm.

6. A process as claimed in claim 5, in which said thickness is 1.5-2.0 mm.

7. A process as claimed in claim 1, and laminating the side of the sheet opposite the embossed side with paper.

8. A process as claimed in claim 7, in which said paper has a weight of at least 30 g/$m^2$.

9. A process as claimed in claim 1, in which said embossing die is pressed against the sheet for about 5-10 seconds.

10. A process as claimed in claim 1, and producing in the sheet, during the embossing step, a depression having a flat bottom, and after the embossing step, introducing into the depression a piece of flat material.

11. A process as claimed in claim 10, in which said flat material carries thereon illustrations.

12. A process as claimed in claim 1, and applying pictorial and/or graphic illustrations to the sheet prior to embossing, and coating the illustrations with a clear varnish before performing the embossing.

13. Process according to claim 1, wherein said embossing die is heated to a temperature of 110°-120° C.

* * * * *